(12) United States Patent
Ueda

(10) Patent No.: US 8,474,985 B2
(45) Date of Patent: Jul. 2, 2013

(54) PROJECTOR LAMP LIGHTING DEVICE SUPPLYING AC CURRENT INCLUDING LOW FREQUENCY REGION HAVING CURRENT REDUCTION WAVEFORM

(75) Inventor: Akira Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 346 days.

(21) Appl. No.: 12/910,923

(22) Filed: Oct. 25, 2010

(65) Prior Publication Data

US 2011/0096248 A1    Apr. 28, 2011

(30) Foreign Application Priority Data

Oct. 26, 2009    (JP) ................. 2009-245138

(51) Int. Cl.
| G03B 21/20 | (2006.01) |
| G05F 1/00 | (2006.01) |
| H05B 37/00 | (2006.01) |
| H05B 37/02 | (2006.01) |
| H05B 39/00 | (2006.01) |
| H05B 39/04 | (2006.01) |
| H05B 41/00 | (2006.01) |
| H05B 41/16 | (2006.01) |
| H05B 41/24 | (2006.01) |
| H05B 41/36 | (2006.01) |
| H01J 11/04 | (2006.01) |
| H01J 13/48 | (2006.01) |
| H01J 15/04 | (2006.01) |
| H01J 17/36 | (2006.01) |

(52) U.S. Cl.
USPC ............. 353/85; 315/246; 315/268; 315/291; 315/307; 315/349

(58) Field of Classification Search
USPC ....... 353/84–86; 315/149, 246–247, 268–269, 315/287, 291, 297, 300, 307, 326, 341–342, 315/349, 360
See application file for complete search history.

(56) References Cited

U.S. PATENT DOCUMENTS 7,023,144 B2 *   4/2006   Suzuki et al. ................. 315/246
7,122,960 B2 *  10/2006   Tukamoto et al. ............. 313/576
(Continued)

FOREIGN PATENT DOCUMENTS

JP          2006-59790           3/2006

*Primary Examiner* — Tony Ko
*Assistant Examiner* — Jori S Reilly-Diakun
(74) *Attorney, Agent, or Firm* — Hamre, Schumann, Mueller & Larson, P.C.

(57) ABSTRACT

A discharge lamp lighting device includes a lamp current control portion that generates, in synchronization with an input video signal, a control signal for controlling polarity reversal of an AC current with a steady-state lighting frequency and an AC current with a low frequency, and a lamp driving portion that drives the discharge lamp based on the control signal that is output by the lamp current control portion. The lamp current control portion generates a control signal for a brightness reduction waveform with timing corresponding to polarity reversal of the AC current with the steady-state lighting frequency, and the lamp driving portion inserts a current reduction waveform into the AC current with the low frequency by decreasing a voltage applied to the discharge lamp based on the control signal for the brightness reduction waveform. It is possible to reduce flicker that could be perceived due to insertion of a period without a reduction of the projection light amount (a period without a polarity reversal at the low frequency) during repeated reductions of the projection light amount occurring at intervals of polarity reversal of the steady-state lighting frequency.

3 Claims, 4 Drawing Sheets

U.S. PATENT DOCUMENTS

| | | |
|---|---|---|
| 7,170,237 B2 * | 1/2007 | Suzuki et al. ................. 315/246 |
| 8,164,266 B2 * | 4/2012 | Okamoto et al. ............... 315/59 |
| 8,258,717 B2 * | 9/2012 | Yamada ........................ 315/291 |
| 8,305,003 B2 * | 11/2012 | Goto et al. .................... 315/246 |
| 2005/0206326 A1 | 9/2005 | Suzuki et al. |
| 2008/0116820 A1 * | 5/2008 | Ozasa et al. .................. 315/246 |
| 2008/0315782 A1 * | 12/2008 | Hirao ............................ 315/224 |
| 2009/0256488 A1 * | 10/2009 | Philiben et al. ............ 315/241 S |

* cited by examiner

PROJECTOR LAMP LIGHTING DEVICE SUPPLYING AC CURRENT INCLUDING LOW FREQUENCY REGION HAVING CURRENT REDUCTION WAVEFORM

BACKGROUND OF THE INVENTION

1. Field of the Invention

The present invention relates to a discharge lamp lighting device for lighting a high-intensity discharge lamp used in a projection-type video display apparatus, and a projection-type video display apparatus that uses a discharge lamp lighting device.

2. Description of Related Art

Examples of projection-type video display apparatuses (hereinafter, also may simply be referred to as "projectors") include liquid crystal projectors that yield a projected video image with transmitted light through a liquid crystal display element, and digital light processing (DLP) (registered trademark) projectors that yield a projected video image with a light reflected by a reflection-type mirror device element such as a digital micro-mirror device (DMD) element. As the white light source used for projectors, high-intensity discharge lamps such as a high-pressure mercury lamp and a xenon lamp are often used.

When discharge lamps are driven by a DC power source, electrons collide with the anode during arc discharge and the temperature of the anode becomes higher than that of the cathode, resulting in a reduced lamp life. For this reason, discharge lamps are driven by alternating the anode and the cathode periodically by applying an AC current at a predetermined frequency to the electrode pair.

As a method for preventing the occurrence of a so-called flicker by stabilizing the position of an arc bright spot in a discharge lamp, JP 2006-059790A discloses a technique by which the discharge lamp is lighted by supplying an AC current with a steady-state lighting frequency f0, and inserting an AC current with a low frequency f1 that is lower than the steady-state lighting frequency f0.

In the case of driving a discharge lamp with an AC current, the current momentarily becomes 0 upon reversal of the current directions, and therefore the lamp brightness is reduced, resulting in a momentary reduction of the projection light amount. In the case of the method disclosed in JP 2006-059790A, the momentary reduction of the projection light amount occurs with different timing between a lamp current with the steady-state lighting frequency f0 and a lamp current with the low frequency f1. That is, even at the timing when the projection light amount is reduced momentarily upon polarity reversal of the lamp current of the steady-state lighting frequency f0, the reduction of the projection light amount does not occur during a period without a polarity reversal in the lamp current at the low frequency f1.

FIG. 6 (a) schematically shows a waveform example of a lamp current in the method disclosed in JP 2006-059790A. FIG. 6 (b) shows an example of the changes in the projection light amount due to the current waveform. At the time of polarity reversal of the current with the steady-state lighting frequency f0, a brightness reduction waveform 10 as shown in FIG. 6 (b) is generated, and the projection light amount is momentarily reduced. An enlarged view of the brightness reduction waveform 10 is shown in FIG. 7. On the other hand, the reduction of the projection light amount does not occur during a period without a polarity reversal in the lamp current at the low frequency f1. The locations indicated by oval FIG. 20 in FIG. 6 (b) correspond to timings at which the reduction of brightness does not occur in the case of the low frequency f1 even if the reduction of brightness occurs in the case of the steady-state lighting frequency f0.

According to a drive waveform without a period of a lamp current of the low frequency f1, the reduction of the projection light amount occurs regularly at intervals of polarity reversal of the current with the steady-state lighting frequency f0, which is a comparatively high frequency (at least 60 Hz). Therefore, it is unlikely that flicker resulting from this brightness reduction waveform 10 is perceived.

In contrast, with a drive waveform having a period of the low frequency f1, a period without a reduction of the projection light amount (a period without a polarity reversal in the current at the low frequency f1, which corresponds to the locations indicated by the oval FIGS. 20 in FIG. 6 (b)), is inserted during repeated reductions of the projection light amount occurring at intervals of polarity reversal of the steady-state lighting frequency f0. This may be perceived as flicker.

When a lamp current in which an AC current with the low frequency f1 is inserted into an AC current with the steady-state lighting frequency f0 is used for a one-chip DLP projector, the following problem occurs. FIG. 8 shows an example of a typical four-color (R, G, B, W) color wheel used for a one-chip DLP projector. FIG. 9 shows an example of the state of projection light and so forth for the above-described case. FIG. 9 (a) shows the lamp current, FIG. 9 (b) shows on/off timing in a single pixel of the video display element (DMD), and FIG. 9 (c) shows the changes in the projection light amount.

In the case of a one-chip DLP projector, usually the polarity reversal of the steady-state lighting frequency f0 is performed at boundaries between segments of the color wheel. The purpose of this is to minimize the reduction of the projection light amount due to the polarity reversal and the deterioration of the video image quality caused by overshoot, ringing, and the like. As shown in FIG. 9 (a), in the lamp current with the steady-state lighting frequency f0, the polarity reversal is performed at boundaries between the color segments (R, G, B, W). Further as shown in FIG. 9 (b), the pixel is switched between on and off at a timing corresponding to the middle of the width of the lamp current that corresponds to each of the color segments.

Ordinarily, a color boundary rarely is contained in a period where each pixel is turned on. However, in order to enable detailed video expression, there may be cases where boundary-on waveforms 13 and 14 containing a color boundary are used. Consequently, boundary light amount waveforms 15 and 21 are contained in the projection light, as shown in FIG. 9 (c). Enlarged views of these boundary light amount waveforms 15 and 21 are as shown in FIGS. 10 and 11. The boundary light amount waveform 15 in FIG. 10A contains a brightness reduction waveform in which the projection light amount is reduced due to the influence of the polarity reversal of the steady-state lighting frequency f0. On the other hand, there is no reduction of the projection light amount in the boundary light amount waveform 21 in FIG. 11 since this waveform is in the period without a polarity reversal at the low frequency f1.

As described above, in the example of the one-chip DLP projector in FIG. 9 as well, a period without a reduction of the projection light amount is inserted during repeated reductions of the projection light amount occurring at intervals of the polarity reversal at the steady-state lighting frequency f0, and therefore this may be perceived as flicker. Moreover, when the number of on-periods is small as shown in FIG. 9 (b) and so the total brightness is low, the ratio of (reduction of projection light amount indicated by the boundary light amount waveform 15)/(total brightness) becomes high, further increasing the possibility of being perceived as flicker.

SUMMARY OF THE INVENTION

It is an object of the present invention to provide a discharge lamp lighting device capable of reducing a flicker that could be perceived due to insertion of a period without a polarity reversal at a low frequency which causes no reduction of the projection light amount, during repeated reductions of the projection light amount occurring at intervals of polarity reversal of a steady-state lighting frequency, while having a configuration in which the position of an arc bright spot in a discharge lamp is stabilized by inserting an AC current with the low frequency into an AC current with the steady-state lighting frequency.

It is another object of the invention to provide a projection-type video display apparatus that uses this discharge lamp lighting device.

In order to solve the above-described problem, a discharge lamp lighting device according to the present invention is configured to light a discharge lamp by supplying an AC current with a steady-state lighting frequency, and inserting an AC current with a low frequency that is lower than the steady-state lighting frequency. The device includes a lamp current control portion that generates, in synchronization with an input video signal, a control signal for controlling polarity reversal of the AC current with the steady-state lighting frequency and the AC current with the low frequency, and a lamp driving portion that drives the discharge lamp based on the control signal that is output by the lamp current control portion. The lamp current control portion generates a control signal for a brightness reduction waveform with timing corresponding to polarity reversal of the AC current with the steady-state lighting frequency, and the lamp driving portion inserts a current reduction waveform into the AC current with the low frequency by decreasing a voltage applied to the discharge lamp based on the control signal for the brightness reduction waveform.

A projection-type video display apparatus according to the present invention includes a discharge lamp lighting device having the above-described configuration, a video display element that spatially modulates projection light from the discharge lamp, a video display element driving portion that drives the video display element based on an input video signal, and a projection optical system that projects output light from the video display element.

With the above-described configurations, it is possible to stabilize the position of an arc bright spot in a discharge lamp by inserting an AC current with the low frequency into an AC current with the steady-state lighting frequency. Moreover, by inserting a current reduction waveform into an AC current with the low frequency, it is possible to reduce flicker that would be perceived due to insertion of a period without a polarity reversal at the low frequency which causes no reduction of the projection light amount during repeated reductions of the projection light amount occurring at intervals of polarity reversal of the steady-state lighting frequency.

DETAILED DESCRIPTION OF THE INVENTION

The present invention may have the following embodiments based upon the above-described configuration.

Namely, in the discharge lamp lighting device having the above-described configuration, it is preferable that a reduction of the lamp current in the current reduction waveform is controlled so as to cause a reduction of the lamp brightness equivalent to a reduction of the lamp brightness resulting from the polarity reversal of the AC current with the steady-state lighting frequency.

Furthermore, in the projection-type video display apparatus having the above-described configuration, it is possible to adopt a configuration further including a color wheel that is located between the discharge lamp lighting device and the video display element, and that includes a plurality of color segments. The color wheel is configured to be rotated to convert white light emitted from the discharge lamp into transmitted light beams in a plurality of colors on a time division basis and to apply the transmitted light beams to the video display element, and the AC current with the steady-state lighting frequency is controlled to be reversed in polarity at boundaries between the color segments.

Accordingly due to the influence of the operation on a time division basis, the ratio of (reduction of projection light amount indicated by the boundary light amount waveform)/(total brightness) becomes high, and therefore it is possible to reduce flicker even in the case where the possibility of being perceived as flicker is further increased.

Hereinafter, embodiments of the present invention will be described in further detail with reference to the accompanying drawings.

(Embodiment 1)

Figure 1:
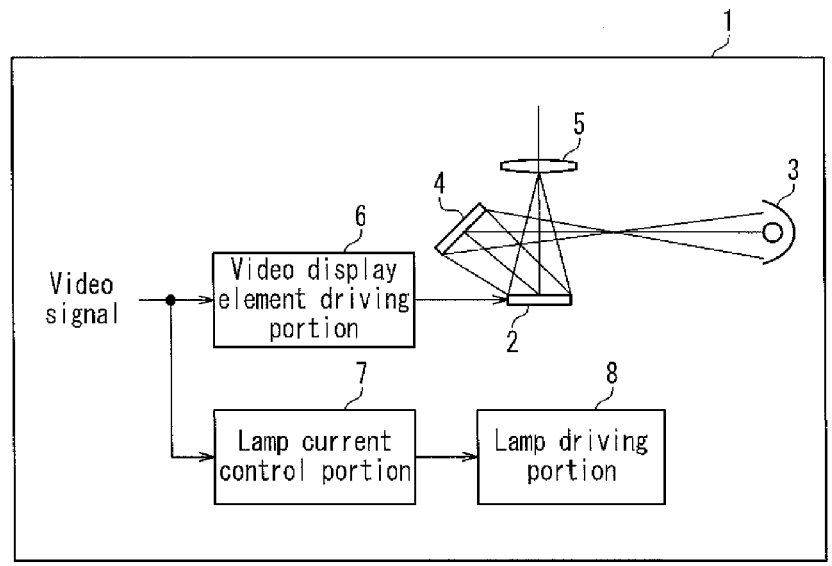
FIG. 1 is a block diagram showing the configuration of a projection-type video display apparatus including a discharge lamp lighting device according to Embodiment 1 of the present invention.

FIG. 1 is a block diagram showing the configuration of a projection-type video display apparatus 1 including a discharge lamp lighting device according to Embodiment 1 of the present invention.

The projection-type video display apparatus 1 includes a reflection-type video display element 2 such as a DMD element, a discharge lamp 3 that generates projection light, a mirror 4 that reflects projection light from the discharge lamp 3 toward the video display element 2, and a projection lens 5 that projects video light from the video display element 2. Further, the projection-type video display apparatus 1 includes a video display element driving portion 6 that drives the video display element 2 in accordance with an input video signal, a lamp current control portion 7 that outputs a control signal for reversing a polarity of the lamp current in synchronization with an input video signal, and a lamp driving portion 8 for applying a voltage required for the discharge lamp 3 based on a control signal that is input from the lamp current control portion 7.

Similarly to the conventional technology a control signal generated by the lamp current control portion 7 is configured to flow a lamp current in which an AC current with the low frequency f1 is inserted into an AC current with the steady-state lighting frequency f0. In this embodiment, the lamp current control portion 7 is configured additionally to output a control signal having a brightness reduction waveform with timing corresponding to the polarity reversal on each half cycle of the steady-state lighting frequency f0. The lamp driving portion 8 receives the control signal from the lamp current control portion 7, flows a lamp current composed of an AC current with the steady-state lighting frequency f0 into which an AC current with the low frequency f1 is inserted, and decreases the voltage applied to the discharge lamp 3 in accordance with the control signal for a brightness reduction waveform. Accordingly, the current reduction waveform is inserted in the period of the low frequency f1.

Light that is generated by the discharge lamp 3 is irradiated onto and refracted by the mirror 4, so as to be irradiated onto the video display element 2. The reflected light that has been spatially modulated by the video display element 2 is magnified through the projection lens 5, and projected to a screen (not shown) as a video image. Due to the current reduction waveform generated by the lamp driving portion 8, the reduction of light amount occurs in the projection light from the discharge lamp 3 with timing as described below.

Figure 2:
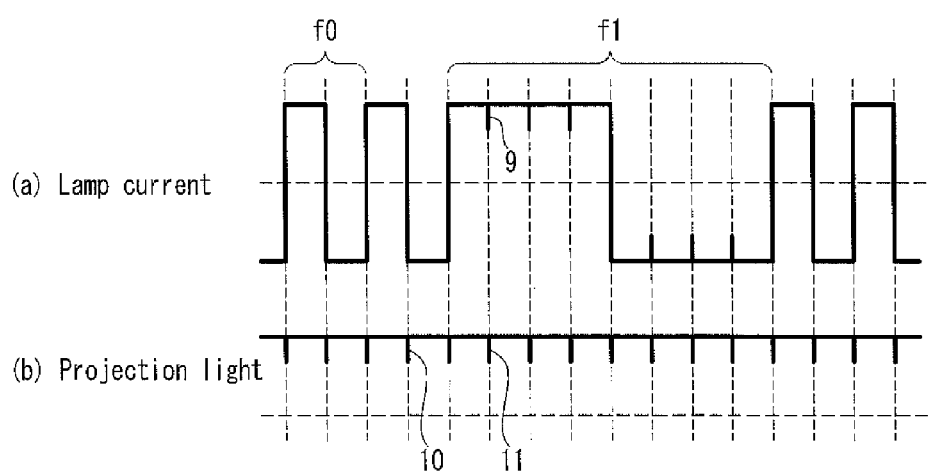
FIG. 2 is a waveform diagram showing an operation of the same discharge lamp lighting device.

FIG. 2 is a waveform diagram showing an operation in the discharge lamp lighting device according to this embodiment. The discharge lamp lighting device is defined as a unit including the discharge lamp 3, the lamp current control portion 7, and the lamp driving portion 8 in FIG. 1. FIG. 2 (a) shows a lamp current waveform of the discharge lamp 3, and FIG. 2 (b) shows the changes in the amount of projection light projected from the projection lens 5.

Figure 6:
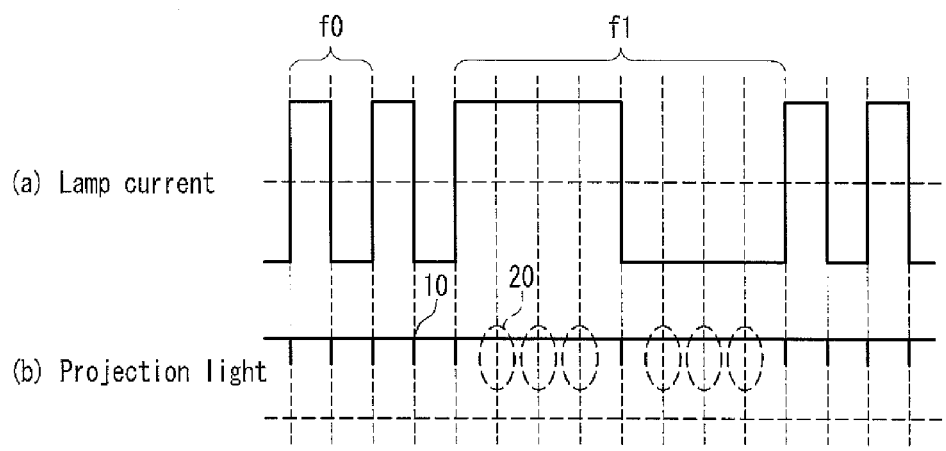
FIG. 6 is a waveform diagram showing an operation of a discharge lamp lighting device of a conventional example.
Figure 7:
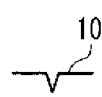
FIG. 7 is an enlarged view of a brightness reduction waveform 10 in FIG. 6.

The waveform in FIG. 2 (a) includes the period of the steady-state lighting frequency f0 and the period of the low frequency f1, similarly to the waveform shown in FIG. 6 (a). The difference from the waveform in FIG. 6 (a) is that a current reduction waveform 9 is inserted in the period of the low frequency f1 with timing corresponding to the polarity reversal on each half cycle of the steady-state lighting frequency f0. As described above, the lamp current control portion 7 outputs a control signal for a brightness reduction waveform to the lamp driving portion 8 with timing corresponding to the polarity reversal on each half cycle of the steady-state lighting frequency f0. The lamp driving portion 8 receives that control signal, and decreases the voltage applied to the discharge lamp 3, thus generating the current reduction waveform 9.

Due to the current reduction waveforms 9, the amount of projection light projected from the projection lens 5 changes as shown in FIG. 2 (b). That is, due to the effect of the current reduction waveforms 9 inserted in the period of the low frequency f1, a brightness reduction waveform 11 is generated in the projection light. Consequently, the brightness reduction waveform 11 is generated in the period of the low frequency f1 with the timing corresponding to the brightness reduction waveform 10 that is generated upon polarity reversal of the steady-state lighting frequency f0. Accordingly, the cycle of the reduction of the projection light amount becomes constant, making it possible to reduce flicker.

The reduction of the lamp current in the current reduction waveform 9 preferably is controlled to cause a reduction of the lamp brightness equivalent to the reduction of the lamp brightness resulting from the polarity reversal of the AC current with the steady-state lighting frequency f0. However; even if the reduction of the lamp brightness is not equivalent, a considerable effect can be achieved if the timing matches.

(Embodiment 2)

Figure 3:
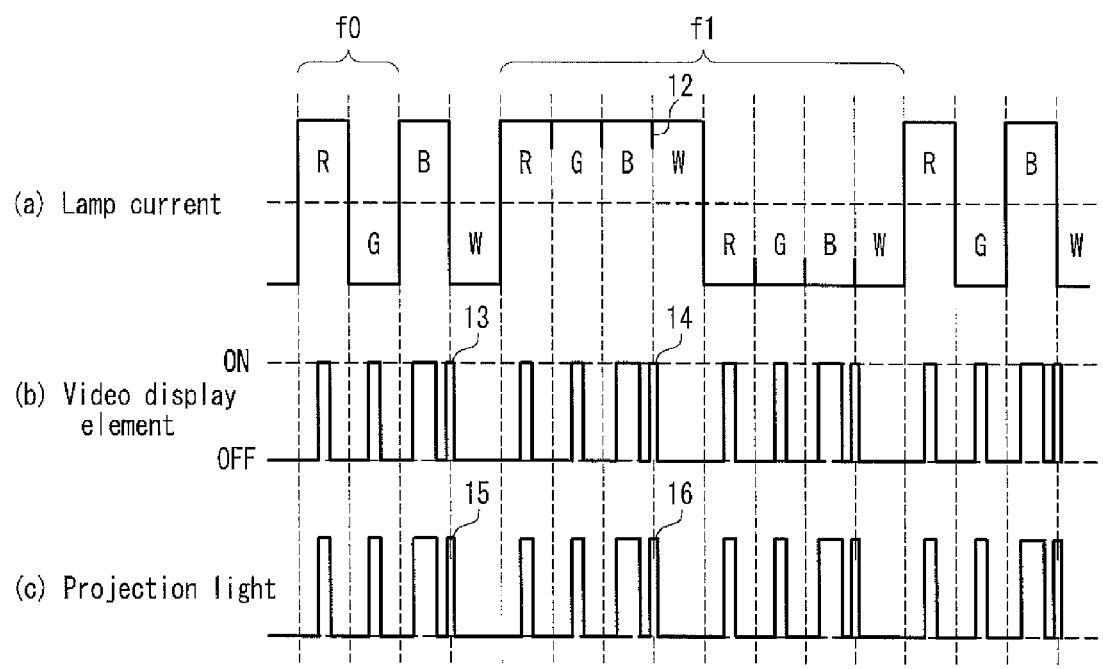
FIG. 3 is a waveform diagram showing an operation of a discharge lamp lighting device according to Embodiment 2 of the present invention.
Figure 4:
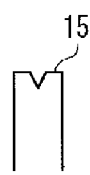
FIG. 4 is an enlarged view of a boundary light amount waveform 15 in FIG. 3.
Figure 5:
FIG. 5 is an enlarged view of a boundary light amount waveform 16 in FIG. 3.
Figure 8:
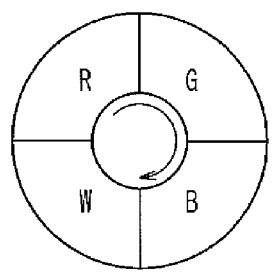
FIG. 8 is a plan view showing an example of a typical four-color color wheel used for a one-chip DLP projector.

A discharge lamp lighting device according to Embodiment 2 of the present invention will be described with reference to FIG. 3 to FIG. 5. The basic configuration of a projection-type video display apparatus 1 is the same as that of the apparatus according to Embodiment 1 shown in FIG. 1. This embodiment relates to a configuration example of a discharge lamp lighting device that is used for a one-chip DLP projector having a four-color color wheel as shown in FIG. 8. FIG. 3 shows an example of the waveform diagram showing an operation performed by the discharge lamp lighting device according to this embodiment. FIG. 3 (a) shows the lamp current, FIG. 3 (b) shows on/off timing in a single pixel of a video display element (DMD), and FIG. 3 (c) shows the changes in the projection light amount.

Figure 9:
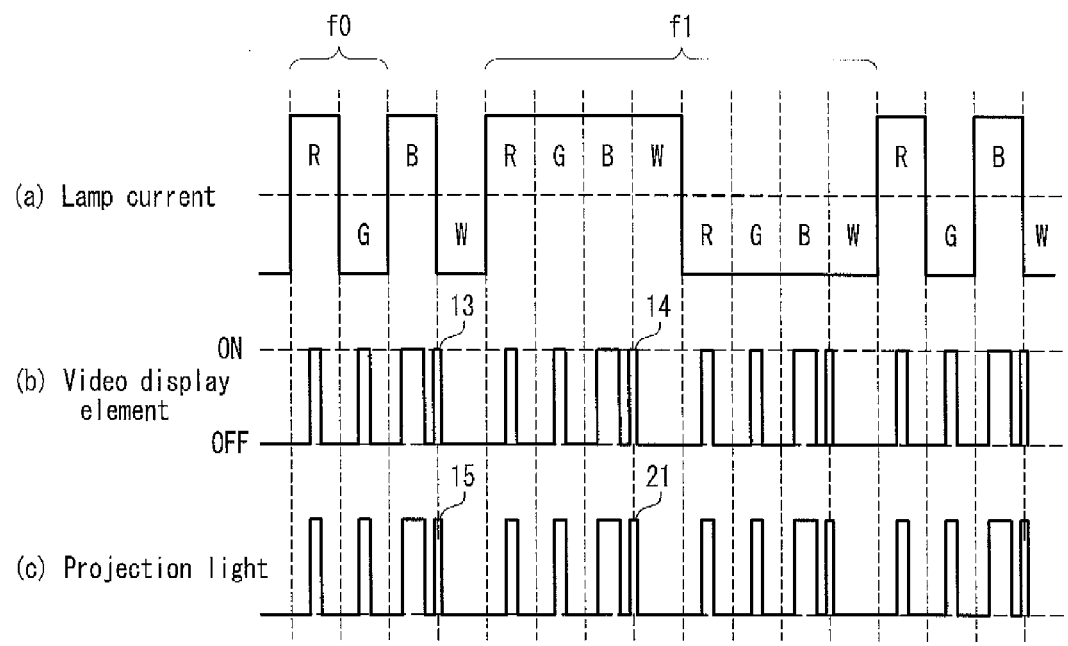
FIG. 9 is a waveform diagram showing an operation of a discharge lamp lighting device of another conventional example.
Figure 10:
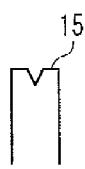
FIG. 10 is an enlarged view of a boundary light amount waveform 15 in FIG. 9.
Figure 11:
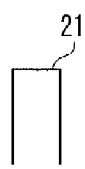
FIG. 11 is an enlarged view of a boundary light amount waveform 21 in FIG. 9.

The lamp current in FIG. 3 (a) includes the period of the steady-state lighting frequency f0 and the period of the low frequency f1, similarly to the case in FIG. 9 (a). Furthermore, in the lamp current with the steady-state lighting frequency f0, the polarity reversal is performed at boundaries between the color segments. The difference from the lamp current in FIG. 9 (a) is that a current reduction waveform 12 is inserted in the period of the low frequency f1 with timing corresponding to the polarity reversal on each half cycle of the steady-state lighting frequency f0. The lamp current control portion 7 outputs the control signal for a brightness reduction waveform to the lamp driving portion 8 with timing corresponding to the polarity reversal on each half cycle of the steady-state lighting frequency f0. The lamp driving portion 8 receives that control signal, and decreases the voltage applied to the discharge lamp 3, thus generating a current reduction waveform 12.

The on/off timing waveform in a single pixel shown in FIG. 3 (b) is completely equivalent to the timing waveform shown in FIG. 9 (b). In order to enable detailed video expression, boundary-on waveforms 13 and 14 containing a boundary are used in the waveform shown in FIG. 3 (b) as well, similarly to the case in FIG. 9 (b). However, in this embodiment, the light amount waveforms of the corresponding projection light exhibit a form indicated by boundary light amount waveforms 15 and 16 shown in FIG. 3 (c). FIGS. 4 and 5 show enlarged views of these waveforms. In the boundary light amount waveform 15 in FIG. 4, the projection light amount is reduced due to the influence of the polarity reversal at the steady-state lighting frequency f0. On the other hand, the boundary light amount waveform 16 in FIG. 5, the projection light amount also is reduced due to the effect of the current reduction waveform 12 inserted in the period of the low frequency f1.

As described above, in the example of the one-chip DLP projector, when the number of the on-periods in FIG. 3 (b) is small and the total brightness is low, the ratio of (reduction of projection light amount indicated by the boundary light amount waveform 15)/(total brightness) is increased, which further increases the possibility of perceiving a flicker. In contrast, with this embodiment, it is possible to reduce a flicker by causing a light amount reduction in the boundary light amount waveform 16 in the period of the low frequency f1 with timing corresponding to the reduction in the boundary light amount waveform 15 occurring upon polarity reversal of the steady-state lighting frequency f0.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A discharge lamp lighting device for lighting a discharge lamp by supplying an AC current with a steady-state lighting frequency, and inserting an AC current with a low frequency that is lower than the steady-state lighting frequency, the device comprising:
   a lamp current control portion that generates, in synchronization with an input video signal, a control signal for controlling polarity reversal of the AC current with the steady-state lighting frequency and the AC current with the low frequency; and
   a lamp driving portion that drives the discharge lamp based on the control signal that is output by the lamp current control portion,
   wherein the lamp current control portion generates a control signal for a brightness reduction waveform with timing corresponding to a polarity reversal of the AC current with the steady-state lighting frequency,
   the lamp driving portion inserts a current reduction waveform into the AC current with the low frequency by decreasing a voltage applied to the discharge lamp based on the control signal for the brightness reduction waveform, and
   a reduction of the lamp current in the current reduction waveform is controlled so as to cause a reduction of the lamp brightness equivalent to a reduction of the lamp brightness resulting from the polarity reversal of the AC current with the steady-state lighting frequency.

2. A projection-type video display apparatus comprising:
   the discharge lamp lighting device according to claim 1;
   a video display element that spatially modulates projection light from the discharge lamp;
   a video display element driving portion that drives the video display element based on an input video signal; and
   a projection optical system that projects output light from the video display element.

3. The projection-type video display apparatus according to claim 2, further comprising:
   a color wheel that is located between the discharge lamp lighting device and the video display element, and that includes a plurality of color segments,
   wherein the color wheel is configured to be rotated to convert white light emitted from the discharge lamp into transmitted light beams in a plurality of colors on a time division basis and to apply the transmitted light beams to the video display element, and
   the AC current with the steady-state lighting frequency is controlled to be reversed in a polarity at boundaries between the color segments.

\* \* \* \* \*